March 9, 1954  O. H. SCHUCK  2,671,621
RADIO CONTROLLED INSTRUMENT SYSTEM FOR AIR NAVIGATION
Filed Oct. 15, 1948  7 Sheets-Sheet 1

INVENTOR.
OSCAR HUGO SCHUCK
BY George H Fisher
ATTORNEY

March 9, 1954  O. H. SCHUCK  2,671,621
RADIO CONTROLLED INSTRUMENT SYSTEM FOR AIR NAVIGATION
Filed Oct. 15, 1948  7 Sheets-Sheet 3

Inventor
OSCAR H. SCHUCK
By George H Fisher
Attorney

March 9, 1954    O. H. SCHUCK    2,671,621
RADIO CONTROLLED INSTRUMENT SYSTEM FOR AIR NAVIGATION
Filed Oct. 15, 1948    7 Sheets-Sheet 4

FIG. 4

Inventor
OSCAR H. SCHUCK
George H Fisher
Attorney

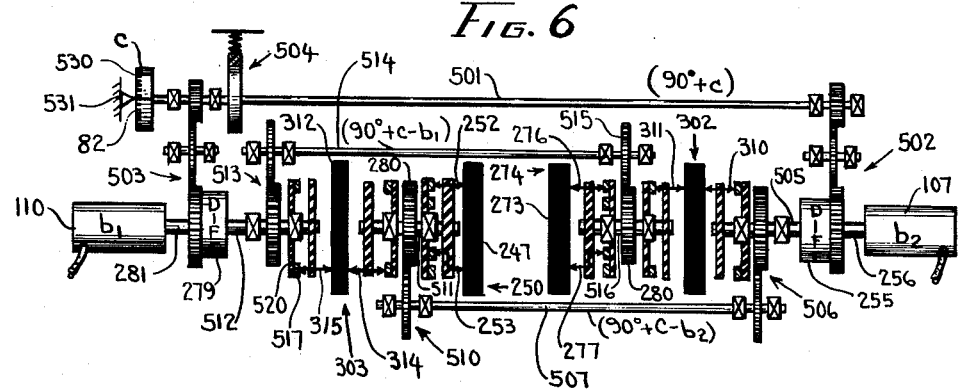
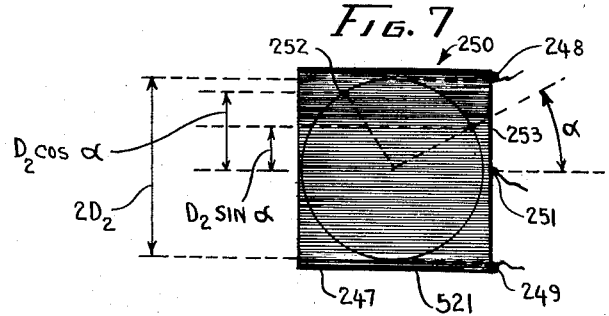
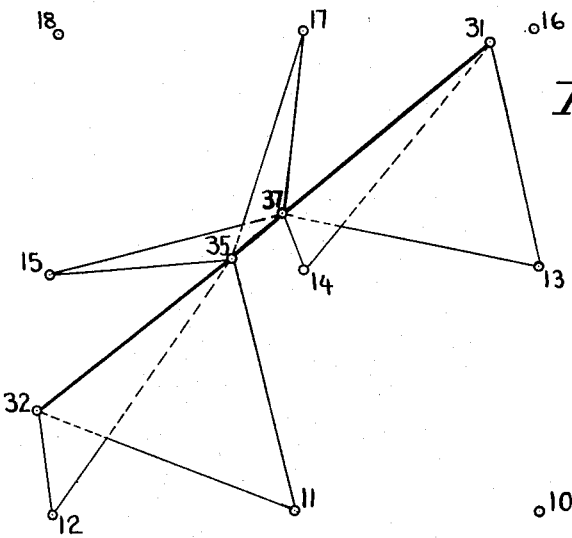
INVENTOR.
OSCAR HUGO SCHUCK
BY George H Fisher
ATTORNEY

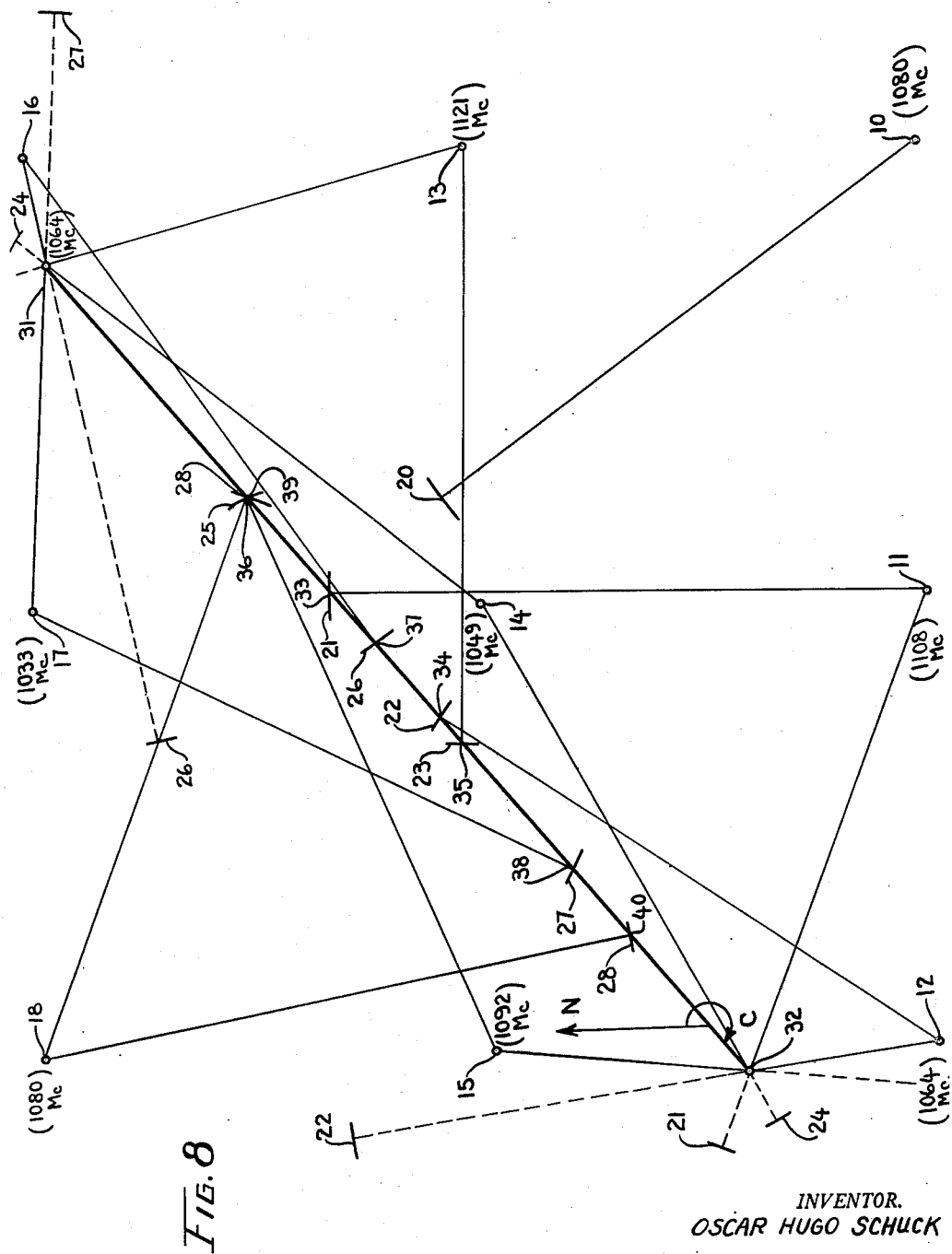

Patented Mar. 9, 1954

2,671,621

UNITED STATES PATENT OFFICE 2,671,621

RADIO CONTROLLED INSTRUMENT SYSTEM FOR AIR NAVIGATION

Oscar Hugo Schuck, Minneapolis, Minn., assignor to Minneapolis-Honeywell Regulator Company, Minneapolis, Minn., a corporation of Delaware Application October 15, 1948, Serial No. 54,648

27 Claims. (Cl. 244—77)

The invention relates to the field of aviation, and more particularly to an improved radio responsive instrument system for use in aircraft.

In aircraft control it is known to regulate the operation of a craft so as to govern its attitude about three axes to bring about directed, level flight. Devices of this nature are referred to as automatic pilots, and they function well as far as control of the attitude of a single craft about its pitch, roll, and yaw axes is concerned, and may also be arranged to maintain the craft at a constant altitude, or air speed, or both.

The attitude of the craft is not the sole factor governing its position with respect to the surface of the earth, and it is this position which must be closely supervised in guiding the craft from a point of origin to a destination. The direction in which a craft moves and its rate of movement also depend upon the direction and magnitude, with respect to the surface of the ground, of the wind encountered by the craft.

Radio aids to air navigation, particularly with respect to direction of movement, are known: most familiar of these are the radio range, with a beam providing A and N signals on opposite sides of a central path, and the radio compass or automatic direction finder. Each of these systems, however, is correlated with a line extending radially from a radio station, and if more than one craft attempt to follow such a line, the danger of collision becomes greater and greater as the craft come nearer and nearer to the station.

In the practice of the present invention, on the other hand, the radio information serves as a basis for establishing a number of nonconverging paths, so that craft may move along different paths without danger of collision. The invention includes sensitive means for indicating to the pilot departure of a craft from its assigned path, and also from its assigned schedule, if desired, and for indicating the distance remaining to be traveled before the craft reaches a specified point on its path. Automatic control of the craft as well as indication is also contemplated.

A general object of the invention is to provide an improved system of aircraft control in which a number of craft may be traveling toward a single destination, by following radio signals, without increase in the collision hazard as the destination is approached.

Another object of the invention is to provide an improved radio actuated system of aircraft control for enabling the pilots of the various craft to bring them to an airport at such assigned intervals that "stacking" at the airport is not necessary.

Another object of the invention is to provide means for causing a craft to follow a predetermined course under the control of signals proportional to the distances of the craft from the fixed points.

A more specific object is to provide means, for installation in an aircraft, which is capable of deriving distance data from the radiations of a selected pair of radio ground stations, and of computing from these data the coordinates of the position of the craft at any time in a co-ordinate system which may be brought into a desired alignment with the positions of the transmitting stations and with a desired ground path.

Yet another object of the invention is to provide means determining the components, perpendicular and parallel to an assigned track, of the displacement of a craft from a scheduled position by means of radio signals as set forth above.

Another object of the invention is to provide means, as described above, capable of indicating the position of a craft with respect to a straight line path, and including means whereby that path may be selected from a number of mutually parallel paths.

Another object of the invention is to provide a navigating computer capable of deriving from the radio signals above described an output proportional to the departure of the craft from a selected straight line course.

Another object of the invention is to provide a navigating computer capable of deriving from the radio signals above described an output proportional to the projection, on a selected straight line course, of the distance from the craft to a selected point.

Another object of the invention is to provide manually adjustable and automatically radio responsive computing means to give output voltages corresponding to the components, along the X- and Y- axes of a Cartesian system, of the displacement of the craft carrying the computing means from an on course position and from its destination. Stated differently, the computing means determine from range radio signals, supplied by a pair of Distance Measuring Equipment installations, and from manually adjusted settings correlating the computer with the terrain over which the flight is being conducted, the off-track distance and the distance to destination of the craft.

A further object of the invention is to control the azimuth of a craft and its air speed in accordance with its off-track distance and distance to destination so obtained.

A specific object of the invention is to provide means for solving one or more of the following equations, in which $(90°+C)$, $x_1$, $y_1$, $x_2$, $y_2$, $x_t$, and $y_t$ are manually settable, $D_1$ and $D_2$ are automatically varied in accordance with the received distance information, and $B_1$ and $B_2$ are computed:

$$x_p = x_1 + D_1 \cos(90°+C-B_1) = $$
$$x_2 + D_2 \cos(90°+C-B_2)$$

$$y_p = y_1 + D_1 \sin(90°+C-B_1) = $$
$$y_2 + D_2 \cos(90°+C-B_2)$$

$$x_d = x_p - x_t$$

and $$y_d = y_p - y_t$$

A further specific object of the invention is to provide means for determining the location of the point of intersection of two datum vectors of known lengths and unknown directions, by observing the discrepancy vector joining the heads of trial vectors having the lengths of the datum vectors and having arbitrarily assumed directions, and then correcting the direction of each trial vector according to the magnitude of the component of the discrepancy vector normal thereto. Various other objects, advantages and features of novelty which characterize my invention will become apparent from a reading of the following specification, or are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which are illustrated and described certain preferred embodiments of the invention.

In the drawing:

Figure 4 is a detailed showing of a converter for connecting the distance measuring equipment to the computer;

Figures 6 and 7 show mechanical details of a portion of the invention; and

Figures 8 and 9 illustrate the application of the invention to a practical problem in navigation.

THEORETICAL CONSIDERATIONS

Figure 1:
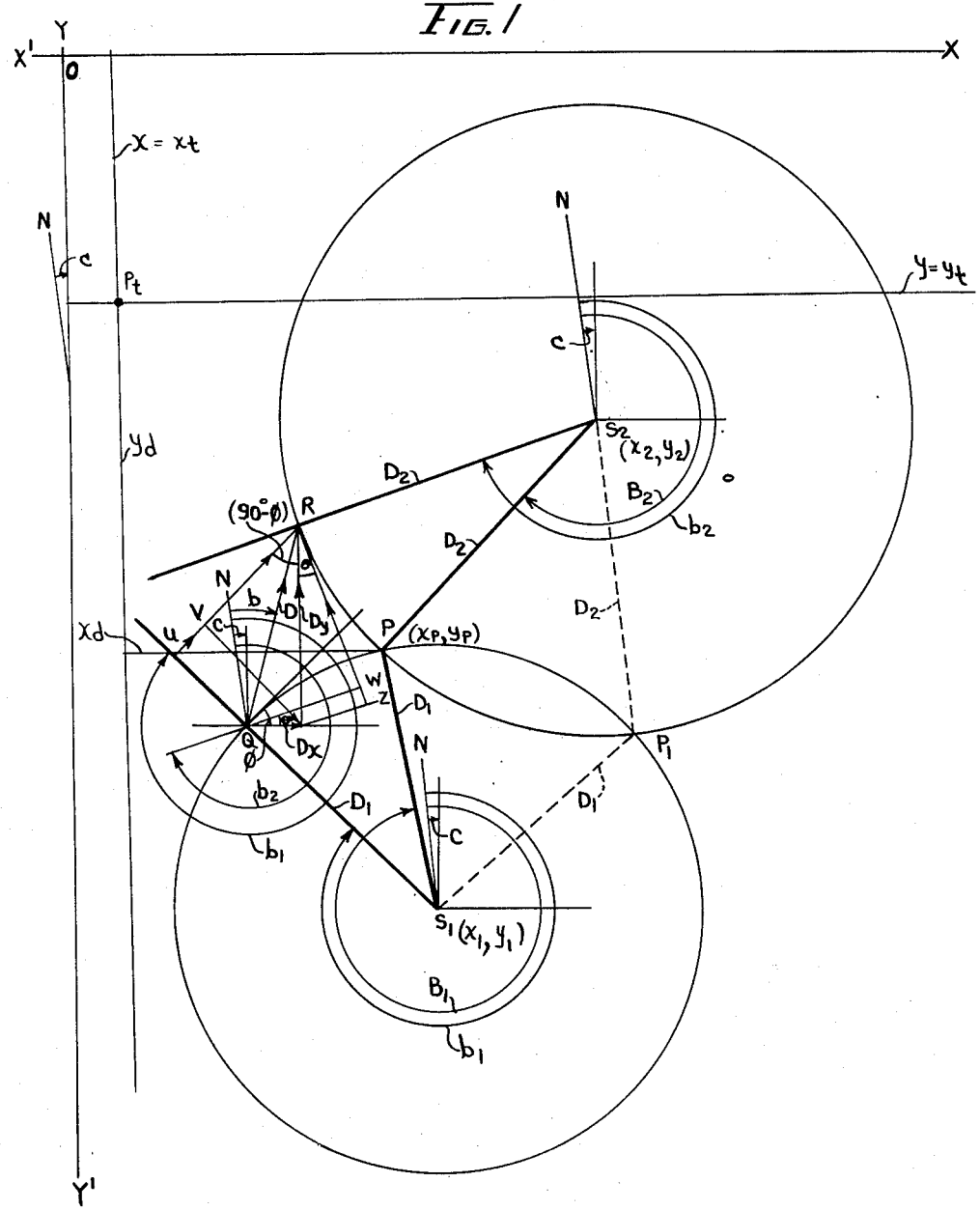
Figure 1 is a diagram illustrating the theoretical basis of a computer according to the invention.

The mathematical procedure underlying the operation of the computer of the present invention will be best understood by reference to Figure 1. Suppose the coordinates $x_1$, $y_1$ and $x_2$, $y_2$ of a pair of points $S_1$ and $S_2$ on a set of coordinate axes X—X' and Y—Y' are known, and suppose the distances $D_1$ and $D_2$ from these points to a third point P are also known. The Y- axis of the coordinate system is at any angle C with the zero of angular measurement, normally geographic north, for angles $B_1$ and $B_2$, which are the bearings of point P from points $S_1$ and $S_2$.

It is possible from these data to determine the coordinates of the point P, in the following fashion.

Assume a pair of arbitrary values $b_1$ and $b_2$ for angles $B_1$ and $B_2$, and draw trial vectors $S_1Q$ and $S_2R$ of lengths $D_1$ and $D_2$ extending at angles $b_1$ and $b_2$ from points $S_1$ and $S_2$ to terminate at points Q and R. Then the discrepancy vector D, drawn from the head of trial vector $S_1Q$ to the head of trial vector $S_2R$, is a measure of the total error in $b_1$ and $b_2$.

It has been determined that if $b_1$ is continuously corrected by an amount proportional to the component of D normal to $S_1Q$ (that is, to $\overline{UR}$), and if $b_2$ is continuously corrected by an amount proportional to the component of D normal to $S_2R$, that is, to $\overline{WR}$, points Q and R move toward P, and that when points Q and R coincide at P, no correcting components remain. The mathematical analysis for this follows.

The coordinates $x_Q$ and $y_Q$ of the point Q are:

$$x_Q = x_1 + D_1 \cos(90°+C-b_1) \qquad (1)$$
$$y_Q = y_1 + D_1 \sin(90°+C-b_1) \qquad (2)$$

The coordinates $x_R$ and $y_R$ of the point R are:

$$x_R = x_2 + D_2 \cos(90°+C-b_2) \qquad (3)$$
$$y_R = y_2 + D_2 \sin(90°+C-b_2) \qquad (4)$$

The components $D_x$ and $D_y$ of D, along the X- and Y- axes, are:

$$D_x = x_R - x_Q = x_2 + D_2 \cos(90°+C-b_2) - x_1 - D_1 \cos(90°+C-b_1) \qquad (5)$$

$$D_y = y_R - y_Q = y_2 + D_2 \sin(90°+C-b_2) - y_1 - D_1 \sin(90°+C-b_1) \qquad (6)$$

The components $d_1$ and $d_2$ of D perpendicular to $S_1Q$ and $S_2R$, respectively, in terms of $D_x$ and $D_y$, and acting to decrease D, are:

$$d_1 = \overline{UV} + \overline{VR}$$
$$= D_x \cos \phi + D_y \cos(90°-\phi)$$
$$= D_x \cos \phi + D_y \sin \phi \qquad (7)$$

$$d_2 = -\overline{ZR} + \overline{ZW}$$
$$= -D_y \cos \theta + D_x \sin \theta \qquad (8)$$

But $$\phi = 360° - [(90°+C-b_1) - 90°]$$
$$= 90° - (90°+C-b_1)$$

Hence $$\sin \phi = \cos(90°+C-b_1) \qquad (9)$$

and $$\cos \phi = \sin(90°+C-b_1) \qquad (10)$$

Likewise $$\theta = 360° - [(90°+C-b_2) + 180°]$$
$$= 180° - (90°+C-b_2)$$

Hence $$\sin \theta = \sin(90°+C-b_2) \qquad (11)$$

and $$\cos \theta = -\cos(90°+C-b_2) \qquad (12)$$

Substituting these values in Equations (7) and (8)

$$d_1 = D_x \sin(90°+C-b_1) + D_y \cos(90°+C-b_1) \qquad (13)$$

and $$d_2 = D_x \sin(90°+C-b_2) + D_y \cos(90°+C-b_2) \qquad (14)$$

Substituting in Equations 13 and 14 the values for $D_x$ and $D_y$ found in Equations 5 and 6, $$d_1 = \sin(90°+C-b_1)[x_2 + D_2 \cos(90°+C-b_2) - x_1$$
$$-D_1 \cos(90°+C-b_1)] + \cos(90°+C-b_1)[y_2$$
$$+D_2 \sin(90°+C-b_2) - y_1$$
$$-D_1 \sin(90°+C-b_1)] \qquad (15)$$

and $$d_2 = \sin(90° + C - b_2)[x_2 + D_2 \cos(90° + C - b_2)$$
$$-x_1 - D_1 \cos(90° + C - b_1)]$$
$$+ \cos(90° + C - b_2)[y_2 +$$
$$D_2 \sin(90° + C - b_2) - y_1$$
$$- D_1 \sin(90° + C - b_1)] \quad (16)$$

The computer comprising a portion of this invention solves Equations 15 and 16 and uses the values $d_1$ and $d_2$ to correct the values of $b_1$ and $b_2$ until D, and hence $d_1$ and $d_2$ become zero.

When D is zero, the points P, Q and R are in coincidence, and their coordinates are the same, as is shown by the following equations, $$x_p = x_1 + D_1 \cos(90° + C - b_1)$$
$$= x_2 + D_2 \cos(90° + C - b_2) \quad (17)$$

and $$y_p = y_1 + D_1 \sin(90° + C - b_1)$$
$$= y_2 + D_2 \sin(90° + C - b_2) \quad (18)$$

The quantity $x_p$ is the distance by which the craft is displaced from the Y-axis of the coordinate system. If the desired path of the craft is along this line, $x = 0$, then $x_p$ is the off-track distance $x_d$ of the craft. If, on the other hand, it is desired to follow some other path, $x = x_t$, then the off-track distance $x_d$ of a craft located at P is given by the equation $$x_d = x_p - x_t \quad (19)$$

The quantity $x_d$ is positive if the craft is to the right of its desired path. When $x_t = 0$, $x_d = x_p$.

The quantity $y_p$ is the distance from the origin to the position of the craft, that is, the craft's distance to destination. If it is known from the craft's schedule that at a particular instant the craft is supposed to be distant $y_t$ from the origin, then the off-schedule distance $y_d$ of the craft located at point P at that instant is given by the equation $$y_d = y_p - y_t \quad (20)$$

The quantity $y_d$ is positive if the craft is ahead of schedule.

The human pilot can operate the craft so that $x_d$ becomes zero: so long as this condition prevails the craft is on the desired course. The same procedure can be followed by an automatic pilot controlled in azimuth according to $x_d$. Likewise the human pilot can operate the craft in accorlance with the value of $y_d$ found at selected check points for the $y_t$, or in accordance with $y_d$ found for a continuously adjusted value of $y_t$: so long as $y_d = 0$ the craft is on schedule. The automatic pilot can also be controlled to regulate the air speed of the craft so that it remains on schedule, if a suitable computer for $y_t$ is provided. One such computer is disclosed in my copending application 33,608, filed June 17, 1948, and assigned to the assignee of the present application.

In the practice of the invention each of the distances $D_1$ and $D_2$ is obtained in a moving craft by use of radio means such as the known Distance Measuring Equipment, hereafter referred to as the D. M. E., while the constants $x_1$, $y_1$, $x_2$, $y_2$, and C are manually set.

The structure of the D. M. E. is described in the "Third Commonwealth and Empire Conference on Radio for Civil Aviation, Summer 1945," pages 197–205. In brief the operation of the equipment is as follows. A pulse of a first carrier frequency is generated in a timer and radiated from a transmitter, both carried by the craft. The pulse is detected in a ground receiver, which energizes a ground transmitter to radiate another pulse of a second carrier frequency for reception by a receiver in the craft. By circuits, the details of which are not necessary to an understanding of the present invention, the interval between the transmission of the pulse from the craft and the subsequent reception of a resulting pulse at the craft is measured in terms of a voltage. This voltage can be converted to a distance by applying a further correction proportional to the known velocity of propagation of electromagnetic radiations in air, so that a suitably calibrated voltmeter may be used to give direct indications of distance.

Figure 2:
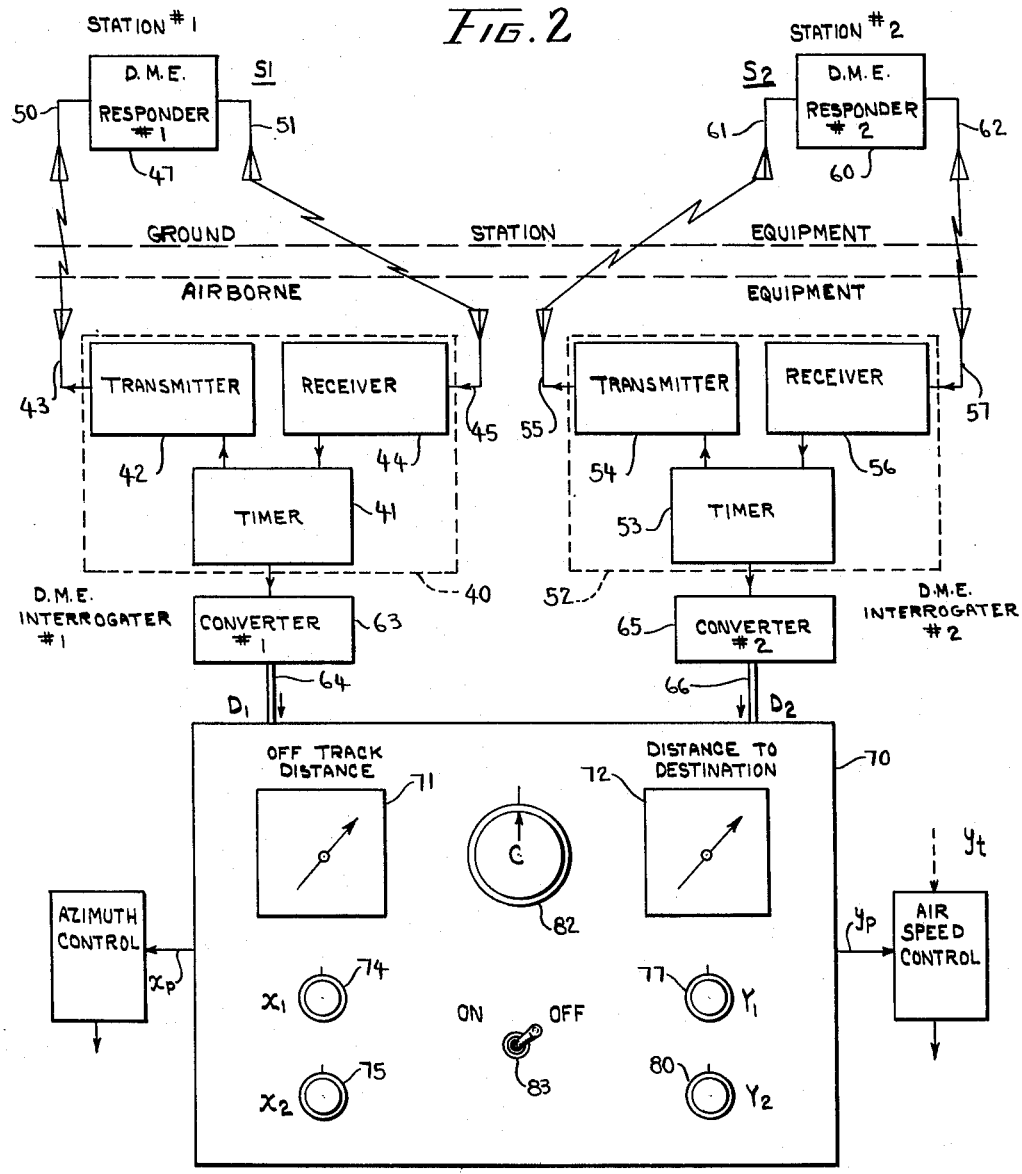
Figure 2 is a general view of the elements making up the invention.

A physical embodiment of means for practicing the invention is shown in Figure 2 to comprise air-borne apparatus and apparatus located at not less than two ground stations.

The air-borne installation includes two of the "interrogators" or air-borne components of the D. M. E., and each ground station installation includes a D. M. E. "responder."

In Figure 2 interrogator No. 1 is shown at 40 to comprise a timer 41, a transmitter 42 having a transmitting antenna system 43, and a receiver 44 having a receiving antenna system 45. Responder No. 1, located at station $S_1$ and indicated by the reference numeral 47, is shown to have a receiving antenna system 50 and a transmitting antenna system 51.

Interrogator No. 2 is shown at 52 to comprise a timer 53, a transmitter 54 having a transmitting antenna system 55, and a receiver 56 having a receiving antenna system 57. Responder No. 2, located at station $S_2$ and indicated by the reference numeral 60, is shown to have a receiving antenna system 61 and a transmitting antenna system 62.

Means must be supplied for deriving from the voltage outputs of timers 41 and 53 mechanical outputs also proportional to $D_1$ and $D_2$. To this end timer 41 of interrogator 40 is shown to supply a signal to a first converter 63, which in turn supplies at 64 a mechanical rotation proportional to $D_1$. Similarly, timer 53 of interrogater 52 supplies a signal to a second converter 65, which in turn supplies at 66 a mechanical rotation proportional to $D_2$. By this means a computer 70 is kept continuously adjusted in accordance with the values of $D_1$ and $D_2$.

The distances $D_1$ and $D_2$ as indicated by the D. M. E. are the straight lines or "slant" distances from the craft to the ground stations. In the foregoing theoretical discussion it has been assumed that these distances are in a plane, and the effect of altitude and of the curvature of the earth have been neglected. The small effective range of the D. M. E. equipment validates the use of plane geometry, and as a practical matter the error introduced by neglecting the effect of altitude is significant only for flights at extremely high altitudes, or along courses passing very close to one of the ground stations.

Positional uncertainty for a given amount of error in the distance data increases as the line joining the ground stations used for guiding is approached, so ground paths passing near such stations are avoided. The altitude effect is therefore important only for flights at altitudes not at present contemplated.

It is of course possible to correct the indicated distances $D_1$ and $D_2$ before supplying outputs proportional thereto to the computer, by interposing a subordinate computer. This may be either arithmetical, based on the Pythagorean Theorem, or trigonometrical, including a simplified resolver of the type disclosed herein. Such a refinement is not however considered necessary to satisfactory operation of the system.

THE NAVIGATING COMPUTER

Computer 70 is shown to comprise two indicators 71 and 72, a number of manual knobs 74, 75, 77, 80, and 82, and a switch 83, and to give outputs $x_p$ and $y_p$ for use in controlling the azimuth and air speed of the craft respectively, the latter in combination with an input proportional to $y_t$ supplied by a suitable schedule computer not shown.

Figure 3:
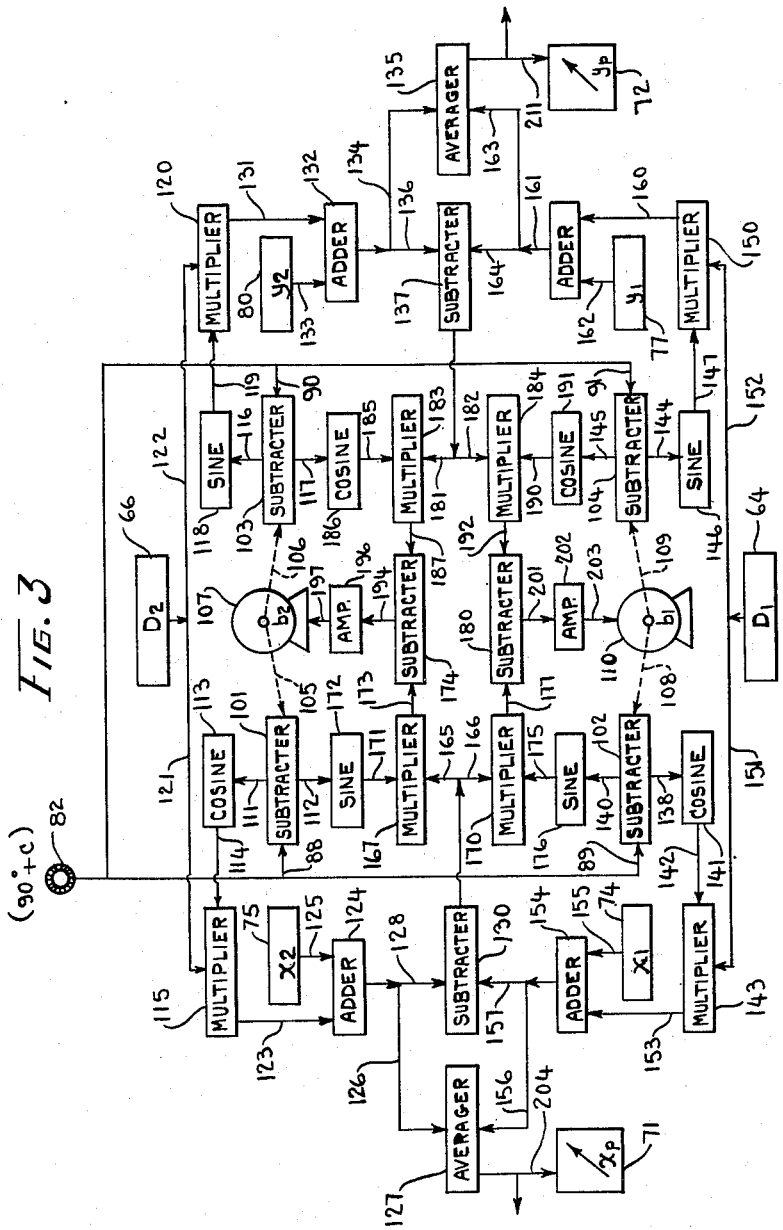
Figure 3 is a block diagram showing the functional relationship of elements making up the computer of Figure 2.

Computer 70 is presented functionally in Figure 3. Knob 82 provides a number of inputs 88, 89, 90, and 91 for a plurality of subtracters 101, 102, 103, and 104. The second input for subtracters 101 and 103 is supplied at 105 and 106 by a motor 107, and second inputs for subtracters 102 and 104 are supplied at 108 and 109 by a motor 110.

Subtracter 101 gives two difference outputs 111 and 112. Output 111 is applied to a cosine device 113, which supplies an input 114 to a multiplier 115. Subtracter 103 also gives two difference outputs 116 and 117. Output 116 is applied to a sine device 118, which supplies an input 119 to a multiplier 120.

A pair of inputs 121 and 122 proportional to $D_2$ are supplied to multipliers 115 and 120. The product output 123 of multiplier 115 is supplied to an adder 124, together with an input 125 from knob 75, and the sum output is supplied as 126 to an averager 127 and as 128 to a subtracter 130. The product output 131 of multiplier 120 is supplied to an adder 132, together with an input 133 from knob 80, and the sum output is supplied as at 134 to an averager 135 and as at 136 to a subtracter 137.

Subtracter 102 gives two outputs 138 and 140. Output 138 is applied to a cosine device 141 which supplies an output 142 to a multiplier 143. Subtracter 104 also gives two outputs 144 and 145. Output 144 is applied to a sine device 146 which supplies an input 147 to a multiplier 150.

A pair of inputs 151 and 152 proportional to $D_1$ are supplied to multipliers 143 and 150. The product output 153 of multiplier 143 is supplied to an adder 154 together with an input 155 from knob 74, and the sum output is supplied as at 156 to averager 127, and as at 157 to subtracter 130. The output 160 of multiplier 150 is supplied to an adder 161, together with an input 162 from knob 77, and the sum output is supplied as at 163 to averager 135 and as at 164 to subtracter 137.

The output of subtracter 130 is supplied as at 165 and 166 to a pair of multipliers 167 and 170. A second output is supplied at 171 to multiplier 167, from a sine device 172 to which output 112 of subtracter 101 is fed. The output 173 from multiplier 167 is fed to a subtracter 174. A second output is supplied at 175 to multiplier 170, from a sine device 176 to which output 140 of subtracter 102 is supplied. The output 177 from multiplier 170 is fed to a subtracter 180.

The output of subtracter 137 is supplied as at 181 and 182 to multipliers 183 and 184. A second output is supplied at 185 to multiplier 183, from a cosine device 186 to which output 117 of subtracter 103 is fed. The output 187 from multiplier 183 is fed to subtracter 174. A second output is supplied at 190 to multiplier 184 from a cosine device 191 to which output 145 of subtracter 104 is fed. The output 192 from multiplier 184 is fed to subtracter 180.

The output 194 of subtracter 174 is fed to a motor control amplifier 196 which feeds motor 107 through a connection 197. The output 201 of subtracter 180 is fed to a motor control amplifier 202 which feeds motor 110 through a connection 203.

The output 204 of averager 127 is fed to indicator 71. The output 211 of averager 135 is fed to indicator 72. Each of these outputs may also be fed to suitable craft control means not shown in Figure 3.

The fundamental operation of the computer will be understood by a study of the following tabulation of the values represented by the various outputs in Figure 3.

*Table I*

| | |
|---|---|
| 88 | $90°+C$ |
| 89 | $90°+C$ |
| 90 | $90°+C$ |
| 91 | $90°+C$ |
| 105 | $b_2$ |
| 106 | $b_2$ |
| 108 | $b_1$ |
| 109 | $b_1$ |
| 111 | $90°+C-b_2$ |
| 112 | $90°+C-b_2$ |
| 114 | $\cos(90°+C-b_2)$ |
| 116 | $90°+C-b_2$ |
| 117 | $90°+C-b_2$ |
| 119 | $\sin(90°+C-b_2)$ |
| 121 | $D_2$ |
| 122 | $D_2$ |
| 123 | $D_2 \cos(90°+C-b_2)$ (the X-component of the trial vector $D_2<b_2$) |
| 125 | $x_2$ |
| 126 | $x_2+D_2 \cos(90°+C-b_2)$ (the X-coordinate of point R) |
| 128 | $x_2+D_2 \cos(90°+C-b_2)$ (the X-coordinate of point R) |
| 131 | $D_2 \sin(90°+C-b_2)$ (the Y-component of the trial vector $D_2<b_2$) |
| 133 | $y_2$ |
| 134 | $y_2+D_2 \sin(90°+C-b_2)$ (the Y-coordinate of point R) |
| 136 | $y_2+D_2 \sin(90°+C-b_2)$ (the Y-coordinate of point R) |
| 138 | $90°+C-b_1$ |
| 140 | $90°+C-b_1$ |
| 142 | $\cos(90°+C-b_1)$ |
| 144 | $90°+C-b_1$ |
| 145 | $90°+C-b_1$ |
| 147 | $\sin(90°+C-b_1)$ |
| 151 | $D_1$ |
| 152 | $D_1$ |
| 153 | $D_1 \cos(90°+C-b_1)$ (the X-component of trial vector $D_1<b_1$) |
| 155 | $x_1$ |
| 156 | $x_1+D_1 \cos(90°+C-b_1)$ (the X-coordinate of point Q) |
| 157 | $x_1+D_1 \cos(90°+C-b_1)$ |
| 160 | $D_1 \sin(90°+C-b_1)$ (the Y-component of trial vector $D_1<b_1$) |
| 162 | $y_1$ |
| 163 | $y_1+D_1 \sin(90°+C-b_1)$ (the Y-coordinate of point Q) |
| 164 | $y_1+D_1 \sin(90°+C-b_1)$ |
| 165 | $x_2+D_2 \cos(90°+C-b_2)-x_1-D_1 \cos(90°+C-b_1)$ $(D_x)$ |
| 166 | $x_2+D_2 \cos(90°+C-b_2)-x_1-D_1 \cos(90°+C-b_1)$ $(D_x)$ |
| 171 | $\sin(90°+C-b_2)$ |
| 173 | $\sin(90°+C-b_2)[x_2+D_2 \cos(90°+C-b_2)-x_1-D_1 \cos(90°+C-b_1)]$ |
| 175 | $\sin(90°+C-b_1)$ |

177  $\sin(90°+C-b_1)[x_2+D_2\cos(90°+C-b_2) - x_1-D_1\cos(90°+C-b_1)]$

181  $y_2+D_2\sin(90°+C-b_2) - y_1-D_1\sin(90°+C-b_1)\,(D_y)$

182  $y_2+D_2\sin(90°+C-b_2) - y_1-D_1\sin(90°+C-b_1)\,(D_y)$

185  $\cos(90°+C-b_2)$

187  $\cos(90°+C-b_2)[y_2+D_2\sin(90°+C-b_2) - y_1-D_1\sin(90°+C-b_1)]$

190  $\cos(90°+C-b_1)$

192  $\cos(90°+C-b_1)[y_2+D_2\sin(90°+C-b_2) - y_1-D_1\sin(90°+C-b_1)]$

194  $\sin(90°+C-b_2)[x_2+D_2\cos(90°+C-b_2) - y_1-D_1\cos(90°+C-b_1)] - \cos(90°+C-b_2)[y_2+D_2\sin(90°+C-b_2) - y_1-D_1\sin(90°+C-b_1)]\,(d_1)$ 201  $\sin(90°+C-b_1)[x_2+D_2\cos(90°+C-b_2) - x_2-D_1\cos(90°+C-b_1)] - \cos(90°+C-b_1) - \cos(90°+C-b_1)[y_2+D_2\sin(90°+C-b_2) - y_1-D_1\sin(90°+C-b_1)]\,(d_2)$ 204  $\dfrac{x_2+D_2\cos(90°+C-b_2)+x_1+D_1\cos(90°+C-b_1)}{2}\,(x_p)$ 211  $\dfrac{y_2+D_2\sin(90°+C-b_2)+y_1+D_1\sin(90°+C-b_1)}{2}\,(y_p)$ From the foregoing it will be seen that the computer of Figure 3 performs the steps followed in the mathematical analysis previously given. The coordinates of point Q appear as outputs 156, 157 and 163, 164. The coordinates of point R appear as outputs 126, 128 and 134, 136. The components $D_x$ and $D_y$ of the discrepancy vector D appear as outputs 165, 166 and 181, 182. The components $d_1$ and $d_2$ normal to $D_1$ and $D_2$ for the instantaneous values of $b_1$ and $b_2$ determined by the positions of motors 107 and 110 appear as outputs 194 and 201. These outputs act upon the respective motors through amplifiers 196 and 202 to cause them to operate, changing the value of $b_2$ set in at 105 and 106 and the value of $b_1$ set in at 108 and 109, until $d_1$ and $d_2$ become zero. The motors are then stopped. This is the normal condition of balance of the computer. In this condition, the output of each of averagers 127 and 135 is equal to either of the inputs to that averager, and outputs 204 and 211 are proportional to $x_p$ and $y_p$.

Figure 5:
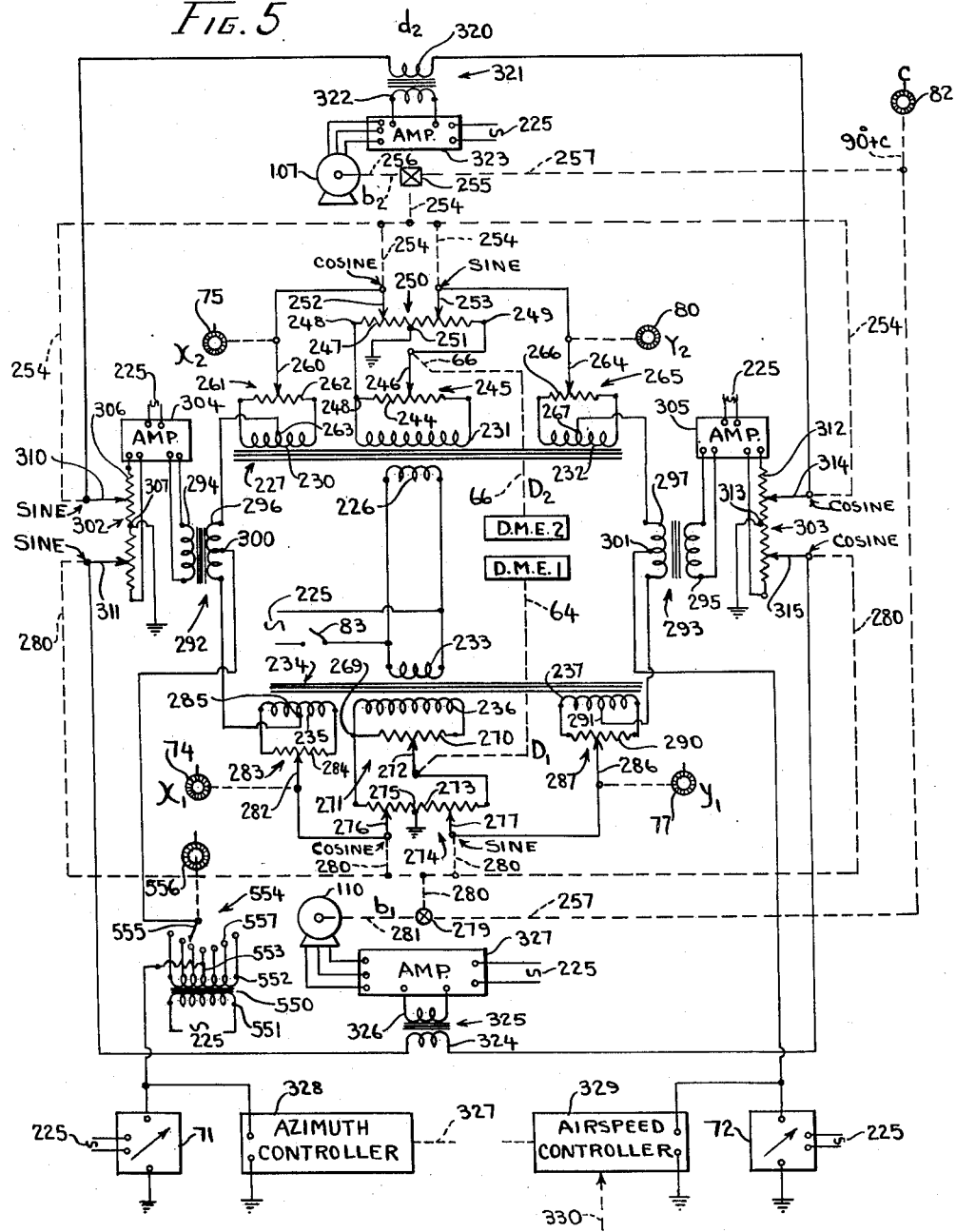
Figure 5 is a detailed wiring diagram of the computer shown in Figures 2 and 3.

The computations suggested functionally in Figure 3 are performed in practice electrically: a circuit for accomplishing this is given in Figure 5, to which reference should now be made.

Means are shown at 225 for connecting the system to any suitable supply of alternating voltage, and will hereafter be referred to as a "source" of said voltage. Alternating voltage from source 225 is supplied through switch 83, to the primary winding 226 of a first transformer 227 having secondary windings 230, 231 and 232, and the primary winding 233 of a second transformer 234 having secondary windings 235, 236, and 237. While shown as parts of separate transformers, all the secondary windings enumerated above can be energized from a single primary winding if desired. Source 225 also energizes other components of the computer as will be pointed out below.

Connected across secondary winding 231 is the linear winding 244 of a voltage divider 245 having a slider 246. Connected between slider 246 and one terminal 248 of winding 244 is the winding 247 of a first resolver 250 having a grounded center tap 251 and a pair of sliders 252 and 253.

Slider 246 is moved along winding 244 by mechanical connection 66 of Figure 2, in accordance with the value of $D_2$ determined as will presently be described. Sliders 252 and 253 of resolver 250 are simultaneously moved along winding 247 by a mechanical output 254 from a differential 255 having a pair of inputs 256 and 257. Input 257 is actuated by knob 82 through an angle $(90°+C)$: this is accomplished by offsetting the knob 82 on its shaft by 90° so that when the knob indicates any angle C, the actual input 257, measured from a selected zero value, is not C, but 90° greater. Input 256 is from motor 107.

The structure of resolver 250 will be described more completely below, and for the present it need only be said that for any voltage applied across winding 247 the voltage between center tap 251 and slider 252 is proportional to the cosine of the angle of displacement of the slider, while that between center tap 251 and slider 253 is proportional to the sine of the angle of displacement of the slider. The connection 66 is so arranged that slider 246 moves from one end to the other of winding 244 when $D_2$ varies from zero to 100 miles, and the output of winding 231 is 200 volts: the voltage between slider 252 and ground is then proportional to $$D_2 \cos(90°+C-b_2)$$

on a scale of 1 volt per mile. Similarly, the voltage between slider 253 and ground is proportional to $D_2 \sin(90°+C-b_2)$, also on a scale of 1 volt per mile. These voltages represent the X- and Y- components of the trial vector $S_2R$ for an assumed direction $b_2$. Unless otherwise indicated, the scale of the instrument is to be consistently one mile per volt, and the scale will not be repeated as each component of the computer is described.

Slider 252 is connected to the slider 260 of a voltage divider 261 having a linear winding 262 energized from secondary winding 230, which is center tapped as at 263, and whose output is 200 volts. The voltage between slider 260 and center tap 263, which is to represent $x_2$, may accordingly vary within a range of plus or minus 100 volts. Slider 260 is actuated by knob 75, within a range of plus or minus 100 miles. The voltage between center tap 263 and ground is hence proportional to $x_2+D_2\cos(90°+C-b_2)$.

Slider 253 is connected to the slider 264 of a voltage divider 265 having a linear winding 266 energized from secondary winding 232, which is center tapped as at 267, and whose output is 200 volts. The voltage between slider 264 and center tap 267, which is to represent $y_2$, may accordingly vary within a range of plus or minus 100 volts. Slide 264 is actuated by knob 80, within a range of plus or minus 100 miles. The voltage between center tap 267 and ground is hence proportional to $y_2+D_2\sin(90°+C-b_2)$.

Connected across secondary winding 236 is the linear winding 270 of a voltage divider 271 having a slider 272. Connected between slider 272 and one terminal 269 of winding 270 is the winding 273 of a resolver 274 having a grounded center tap 275 and a pair of sliders 276 and 277.

Slider 272 is moved along winding 270 by mechanical connection 64 of Figure 2, in accordance with the value of $D_1$ determined as will presently be described. Sliders 276 and 277 of resolver 274 are simultaneously moved along winding 273 by a mechanical output 280 from a differential 279 having a pair of inputs 281 and 257. Input 257 is actuated by knob 82, as described above. Input 281 is from motor 110.

The structure of resolver 274 is like that of resolver 250. For any voltage applied across winding 273, the voltage between center tap 275 and slider 276 is proportional to the cosine of the angle of displacement of the slider, while that between center tap 275 and slider 277 is proportional to the sine of the angle of displacement of the slider. The connection 64 is so arranged that slider 272 moves from one end of winding 270 to the other when $D_1$ varies from zero to 100 miles, and the output of winding 236 is 200 volts: the voltage between slider 276 and ground is then proportional to $D_1 \cos (90°+C-b_1)$. Similarly the voltage between slider 277 and ground is proportional to $D_1 \sin (90°+C-b_1)$. These voltages represent the X- and Y- components of the trial vector $S_1Q$ for an assumed direction $b_1$.

Slider 276 is connected to the slider 282 of a voltage divider 283 having a linear winding 284 energized from secondary winding 235, which is center tapped as at 285, and whose output is 200 volts. The voltage between slider 282 and center tap 285, which is to represent $x_1$, may accordingly vary within a range of plus or minus 100 volts. Slider 282 is adjustable by a knob 74 within a range of plus or minus 100 miles. The voltage between center tap 285 and ground is hence proportional to $x_1+D_1 \cos (90°+C-b_1)$.

Slider 277 is connected to the slider 286 of a voltage divider 287 having a linear winding 290 energized from secondary winding 237, which is center tapped at 291, and whose output is 200 volts. The voltage between slider 286 and center tap 291, which is to represent $y_1$, may accordingly vary within a range of plus or minus 100 volts. Slider 286 is adjustable by knob 77 within a range of plus or minus 100 miles. The voltage between center tap 291 and ground is hence proportional to $y_1 +D_1 \sin (90°+C-b_1)$.

The computer of Figure 5 is shown to include a pair of further transformers 292 and 293 comprising respectively secondary windings 294 and 295 and primary windings 296 and 297, the latter center tapped at 300 and 301 for a purpose later to be set forth. The terminals of primary winding 296 are connected to center taps 263 and 285, and the terminals of primary winding 297 are connected to center taps 267 and 291.

Inasmuch as all of the devices fed from the various transformer secondary windings have similar impedance characteristics, the voltages derived from them will all be either in phase or 180° out of phase with each other. The connections to the various secondary windings are so arranged that at a particular instant in time, the instantaneous polarity of each voltage, for positive values of the several variables, agrees with the algebraic sign of its corresponding quantity in Equations (1) through (4). This being the case, when the computer is balanced so that the discrepancy vector D is zero, and Equation (17) is satisfied, the center taps 263 and 285 are at the same potential: no current flows through primary winding 296 of transformer 292, and no voltage is induced in secondary winding 294. When the computer is not balanced, that is, when a discrepancy vector exists and Equation (17) is not satisfied, a voltage difference exists between center taps 263 and 285. This voltage difference represents the X-component of the discrepancy vector, as given by Equation (5). Current of corresponding magnitude and phase accordingly flows through primary winding 296 of transformer 292, and a corresponding voltage is induced in secondary winding 294. This voltage represents, in magnitude and phase, the X-component of the discrepancy vector.

In the same fashion a voltage is induced in secondary winding 295 of transformer 293 which represents the Y-component of the discrepancy vector. Transformers 292 and 293 are electrically equivalent, so that for equal voltage differences across their primary windings, equal voltages are induced in their secondary windings. The scale of volts per mile is the same for the two transformer secondaries, although it is not necessarily one volt per mile: that scale does not have to extend beyond the primary windings of these transformers.

A resolver 302 is to be energized in accordance with the voltage induced in secondary winding 294, and a resolver 303 is to be energized in accordance with the voltage induced in secondary winding 295. These resolvers are of relatively low impedance, and if connected directly across the secondary windings they draw appreciable current therefrom, which must be supplied by voltage dividers 245, 261, 265, 271, 283, and 287 and resolvers 250 and 274. The voltages supplied by these units do not vary as the desired functions of the displacements of their respective sliders, however, if appreciable current is taken from them. In order to avoid introduction of inaccuracies due to loading of these units, the output of transformer 292 is applied to unloading amplifier 304, and that of transformer 293 is applied to unloading amplifier 305.

Amplifiers 304 and 305 are designed for electrical equivalence, and are preferably stabilized, as by degenerative feedback to make their operation uniform. The input impedance of such amplifiers is very high, as is well known to those skilled in the art, so that they cause no appreciable loading of the voltage dividers and resolvers. The output voltages supplied by the amplifiers, while proportional to the input voltages, derive energy from source 225, and are thus capable of supplying appreciable current.

Amplifier 304 is connected to the winding 306 of resolver 302, which is center tapped at 307. A pair of sliders 310 and 311 are individually movable with respect to winding 306, the former in accordance with $(90°+C-b_2)$ by reason of mechanical connection 254, and the latter in accordance with $(90°+C-b_1)$, by reason of mechanical connection 280. Center tap 307 is grounded.

The output voltage of amplifier 304, like the voltage between the terminals of primary winding 296, is proportional to $$x_1+D_1 \cos (90°+C-b_1) -x_2-D_2 \cos (90° +C-b_2)$$

or to $D_x$: the voltage between slider 310 and ground is accordingly proportional to $$D_x \sin (90°+C-b_2)$$

and the voltage between slider 311 and ground is similarly proportional to $D_x \sin (90°+C-b_1)$.

Amplifier 305 is connected to the winding 312 of resolver 303, which is center tapped at 313. A pair of sliders 314 and 315 are individually movable with respect to winding 312, the former in accordance with $(90°+C-b_2)$ by reason of mechanical connection 254, and the latter in accordance with $(90°+C-b_1)$, by reason of mechanical connection 280.

Center tap 313 is grounded. The output voltage of amplifier 305, like the voltage between the terminals of primary winding 297, is proportional to $$y_1 + D_1 \sin(90°+C-b_1) - y_2 - D_2 \sin(90°+C-d_2)$$

or to $D_y$: the voltage between slider 314 and ground is accordingly proportional to $$D_y \cos(90°+C-b_2)$$

and the voltage between slider 315 and ground is similarly proportional to $D_y \cos(90°+C-b_1)$ Slider 310 of resolver 302 and slider 314 of resolver 303 are connected to the primary winding 320 of a transformer 321 having a secondary winding 322. As long as sliders 310 and 314 are at the same potential, conveniently measured with respect to ground, no current flows in primary winding 320, and no voltage is induced in secondary winding 322. If slider 310 and 314 are not at the same potential, current proportional to their difference, that is, to $d_2$, flows in the primary winding 320 and a voltage output proportional to $d_2$ appears across secondary winding 322 and is impressed on motor control amplifier 323.

Amplifier 323 is energized from source 225, and is connected to control the operation of motor 107. The amplifier is of the well-known type which causes the motor to operate in a first direction if voltage of a first phase is applied to the amplifier input, and in the opposite direction if the input voltage is of the opposite phase, measured with respect to the phase of the voltage supplied to the amplifier by source 225. Thus, whenever $d_2$ is zero, motor 107 is deenergized, and no correction in $b_2$ as supplied to the differential 255 takes place. For all other values of $d_2$ motor 107 is energized, running in a forward or reverse direction according as $d_2$ is positive or negative.

Adjustment of $b_2$ by motor 107 changes the position of sliders 252, 253, 310 and 314, and hence the potentials of the latter two sliders: this in turn changes the input to amplifier 323. The direction of operation of motor 110 is chosen to be that which causes decrease in the input to the amplifier by adjustment of $b_2$ in the direction to decrease its error.

Slider 311 of resolver 302 and slider 315 of resolver 303 are connected to the primary winding 324 of a transformer 325 having a secondary winding 326. As long as slider 311 and 315 are at the same potential, conveniently measured with respect to ground, no current flows in primary winding 324, and no voltage is induced in secondary winding 326. If sliders 311 and 315 are not at the same potential, current proportional to their difference, that is, to $d_1$, flows in the primary winding 324 and a voltage also proportional to $d_1$ appears across secondary winding 326 and is impressed on a motor control amplifier 327.

Amplifier 327 is energized from source 225, and is connected to control the operation of motor 110. The amplifier is of the well-known type which causes the motor to operate in a first direction if voltage of a first phase is applied to the amplifier input and in the opposite direction if the input voltage is of the opposite phase, measured with respect to the phase of the voltage supplied to the amplifier from source 225. Thus whenever $d_1$ is zero, motor 110 is deenergized, and no correction in $b_1$ as supplied to differential 279 takes place. For all other values of $d_1$ motor 110 is energized, running in a forward or reverse direction according as $d_1$ is positive or negative.

Adjustment of $b_1$ by motor 110 changes the position of sliders 276, 277, 311, and 315, and hence the potentials of the latter two sliders: this in turn changes the input to amplifier 327. The direction of operation of motor 110 is chosen to be that which causes decrease in the input to the amplifier by adjustment of $b_1$ in the direction to decrease its error.

In the course of operation of this portion of the computer either of motors 107 and 110 may come to rest or reverse in operation one or more times before the final adjustment is reached. Whenever the discrepancy vector D coincides in direction with one of the trial vectors, the component normal to the trial vector becomes zero. However, continuing correction of the other trial vector changes the direction of the discrepancy vector and a component normal to the first trial vector reappears. Only when the discrepancy vector itself becomes zero do both its components become zero simultaneously, and when this condition is reached the values of $b_1$ and $b_2$ are equal to $B_1$ and $B_2$ respectively, and the trial vectors coincide with the actual datum vectors.

The structure thus far described functions to bring the trial vectors into the angular relation which the datum vectors actually have, but gives no useful output as far as the position of the craft at point P is concerned. Further means are included for obtaining each of the coordinates of the point P.

The X-coordinate of the point P is determined in transformer 292. It was pointed out above that in general the terminals of primary winding 296 are at different potentials with respect to ground. If no appreciable current is drawn through center tap 300, or from secondary winding 294, primary winding 296 can be considered simply as an impedance: the potential of tap 300 is then half way between those of the upper and lower terminals of the winding, since the tap is at its center. In the general case, then, the voltage between tap 300 and ground is the average of the voltages between ground and taps 263 and 285.

When motors 107 and 110 have operated to reduce D to zero, the voltages between ground and center taps 263 and 285 are equal, and all points on primary winding 296 are also at the same potential. The voltage between tap 300 and ground is hence proportional to the cross track coordinate $x_p$ of the position P of the craft. This voltage is impressed upon indicator 71, as shown in Figure 2, which is a center zero instrument. Since the Y-axis of the coordinates has been laid out to coincide with the course which it is desired to follow, any abscissa other than zero for the point P, and therefore any indication other than zero on meter 71, shows that the craft has departed laterally from its desired track.

Indicator 71 may be any type of instrument which gives an indication varying in sense and magnitude with the phase and amplitude of the voltage between center tap 300 and ground. One convenient structure for performing this function comprises a motor which moves a needle with respect to a scale, and which also adjusts an alternating voltage in phase opposition to the $x_p$ voltage until they are equal: operation of the motor then ceases and the position of the needle indicates the value of the signal voltage. Such devices are known: a disclosure of an indicator of this type is to be found in my copending application referred to above.

Sometimes it is desirable to fly a track parallel to the one originally chosen for the Y-axis of the coordinates. Means to make this possible are shown, in Figure 5 only, to comprise a transformer 550, having a primary winding 551 energized from source 225 and a secondary winding 552 having a plurality of taps including a center tap 553, and a tap switch 554, having a switch arm 555 operated by a manual knob 556 and a plurality of fixed contacts 557. Center tap 300 of transformer 292 is connected to switch arm 555. Center tap 553 is connected to indicator 71. The contacts of switch 554 are connected to the taps on secondary winding 552.

Whenever knob 556 is turned so that the switch arm 555 is connected to center tap 553, center tap 300 of transformer 292 is connected directly to indicator 71, so that the voltage supplied to these units is simply that from center tap 300 to ground, or $x_p$. However, if switch arm 555 is connected to some other one of taps 557, a voltage is added in series with the $x_p$ voltage, and the resultant voltage on the indicator and controller is zero not when $x_p=0$, but when $x_p=x_t$. The output voltage from transformer 550 is 60 volts, tapped at 10, 20, 30, 40, and 50 volts, so that the craft can be controlled with respect to the Y-axis or to paths spaced in 10 mile intervals on either side of it.

As described in connection with transformer 292, center tap 301 of transformer 293 is at a potential, with respect to ground, proportional to the ordinate of the point P with respect to the origin of the set of coordinate axes. Since the ordinate is set at the way point or terminus of the flight, this voltage is a measure of the distance to destination of the craft, each way point being considered a "destination" for a portion of the flight. This voltage is impressed on indicator 72, as shown in Figure 2. Although it is not contemplated that flight will continue past the point where $y_p=0$, conditions may conceivably arise where it is desirable to be able to use the apparatus in this fashion, and therefore indicator 72, like indicator 71, is preferably a center zero instrument.

As thus far described, the structure provides indication to a human pilot whereby he is enabled to guide his craft so that it remains on a predetermined course, and so that its distance from selected points is at all times known. Where the additional weight and expense are justified, the system is equally well adapted for automatic control of the craft, and to this end the voltage between center tap 553 and ground is shown as impressed upon an azimuth controller 328, and the voltage between center tap 301 and ground is shown as impressed upon an air-speed controller 329.

Air-speed controller 329 is shown as being provided with an additional input 330 which may be adjusted either manually or automatically to alter the basis of computation so that the actual air speed control function is proportional to the distance of the craft from a scheduled position rather than from the destination. A clear and complete disclosure of each of these controllers is to be found in my copending application previously referred to.

Resolvers 250, 274, 302, and 303 are portions of a single mechanical unit illustrated in Figure 6. Here knob 82 is connected by shaft 501 and gearing 502 and 503 to supply mechanical inputs to differentials 255 and 279. A friction brake 504 acts on shaft 501 to prevent it from being driven by forces acting backward through the differentials, but may be overcome by manual rotation of knob 82. Shaft 501 and gearing 502 and 503 comprise connection 257 of Figure 5.

The input to differential 255 from motor 107 is shown at 256, and the differential has an output shaft 505. Shaft 505 carries slider 310 of resolver 302, and is connected by gearing 506, jack shaft 507, gearing 510 and shaft 511 to drive sliders 252 and 253 of resolver 250 and slider 314 of resolver 303. Shafts 505, 507 and 511 and gearing 506 and 510 comprise mechanical connection 254 of Figure 5.

The input to differential 279 from motor 110 is shown at 281, and the differential has an output shaft 512. Shaft 512 carries slider 315 of resolver 303, and is connected by gearing 513, jack shaft 514, gearing 515, and shaft 516 to drive sliders 276 and 277 of resolver 274 and slider 311 of resolver 302. Shafts 512, 514, and 516 and gearing 513 and 515 comprise mechanical connection 280.

It will be observed that slider 315 makes connection between winding 312 of resolver 303 and a slip ring 517 carried on a fixed insulating member 520. Throughout this resolver structure each slider is provided with similar means for making continuous connection thereto: individual reference numerals have not been applied to the remaining rings to avoid complicating the drawing.

As an illustration of the structure of resolvers 250, 274, 302, and 303, the first will be considered in detail, and is shown in Figure 7. A form 520 of insulating material carries a linear winding 247 of very fine resistance wire: the form may be flat, but is preferably slightly thicker in the center than at the edges, since the winding is more firmly held by a form of this section. Winding 247 has a center tap 251, and is mounted so that the axis of the sliders which contact it is aligned with the center tap.

Two sliders 252 and 253 are shown as engaging winding 247. These sliders are spaced by 90° about their axis of rotation. The length of winding 247 is shown to be equal to twice the radius about which sliders 252 and 253 rotate: this may be accomplished simply, in practice, by making the winding too long originally, and then short-circuiting the unwanted turns with solder along the edges of the winding.

If a voltage of magnitude $2D_2$ is impressed across terminals 248 and 249 of winding 247, the voltages between sliders 252 and 253 and center tap 251 are found to be functions of the angle through which the sliders are rotated, measured counterclockwise, as seen in Figure 7, from the line joining the center of the winding with center tap 251. It will be apparent that as slider 253, for example, moves in a circle across winding 249, the component of its movement parallel to the direction of the wires in the winding produces a negligible change in the voltage between the slider and the center tap: this my be disregarded, and the voltage in question may be considered as influenced only by the component of the movement of the slider normal to the direction of the wires. When $\alpha=0$ the voltage from slider 253 to center tap 251 is zero: when $a$ is 90°, the voltage is $D_2$, and in general the voltage is $D_2 \sin a$. Similarly the voltage between slider 252 and center tap 251 is in general $D_2 \cos a$. If two sliders are provided on opposite sides of the winding but are in the same location, they are at substantially the same potential. In general one or more sliders may be located on one or more sides of a winding and may be driven unitarily or individually along the winding. The voltage from each to center tap 251 is a function of the angle of rotation of the slider from the zero position where it is aligned with center tap 251 and the center of the winding, and located between them.

In setting up the resolver assembly sliders 253, 277, 310 and 311 are adjusted to the position $a=0$. In Figure 7, sliders 252, 276, 314 and 315 are adjusted to positions 90° displaced therefrom in the direction which is to represent increase in $b_1$ and $b_2$. Knob 82 is now fastened to shaft 501 in such a position that its scale 530 is at 270° with respect to a fixed index 531. After all adjustments have been securely fastened, motors 107 and 110 can be connected to their shafts 256 and 281, and resolvers 250, 274, 302, and 303 are ready to perform their functions as given in Figure 5, when suitable inputs for $D_1$ and $D_2$ are supplied to the computer from interrogaters 40 and 52.

THE DISTANCE CONVERTERS

Converters 63 and 65, supply the inputs for $D_1$ and $D_2$, and while not novel in the present application, are essential to the satisfactory operation of the system here disclosed. Accordingly the structure of one of these converters, together with related portions of the D. M. E. equipment, is shown in detail in Figure 4. The output of interrogater 40 is conventionally a voltage applied to a high impedance voltmeter: the purpose of the converter is to derive from this voltage a shaft rotation proportional thereto, without destroying the accuracy of the original system. The interrogater is shown below and to the left of the dotted line 428 in Figure 4, and the voltage in question is impressed on the meter 432, one side of which is connected to the plate of a pentode 433 and the other side of which is connected to the source of plate voltage for the interrogater. The resistance of the pentode is varied by voltages impressed on its control electrodes by means not shown, in accordance with the distance being measured, and thus the voltage between the positive terminal of the power supply and the plate of pentode 433 is also varied.

The most satisfactory method of motor control is one using a rebalancing or null type of control network; such a network must be so designed that the measuring circuit is not loaded down thereby to a point where its accuracy is destroyed. This is accomplished according to the present invention by a comparison arrangement in which first the voltage across the meter and then a comparison voltage is applied to an amplifier of high input resistance, and the amplifier energizes a motor to adjust the comparison voltage to equality with the voltage being measured. The motor shaft rotation also comprises the mechanical output from the converter, since it is a measure of the comparison voltage which is in turn proportional to the distance being measured.

In order to minimize the effect of change in the supply voltage, the comparison voltage is obtained from the same source. Thus a first conductor 434 is connected to the positive terminal 435 of the power supply and a second conductor 436 is connected to ground, which is the negative terminal of the power supply, at 437. In series between these two conductors there are connected a first variable resistor 440, a potential divider 441 having a slider 442 and a linear winding 443, and a second variable resistor 444. The values of resistors 440 and 444 are adjusted so that when meter 432 gives its maximum reading the slider 442 is at the same potential as the negative terminal of the meter if the slider is at the left hand end of winding 443, and when meter 432 gives its minimum reading slider 442 is at the same potential as the meter terminal if at the right hand end of the winding: resistors 440 and 444 are thus centering means coordinating the range of slider 442 with the range of voltage available across meter 432, and hence with the range within which $D_1$ or $D_2$ can vary.

The converter includes an interrupter 445 having a winding 446, a movable contact 447, and a pair of fixed contacts 450 and 451. Winding 446 is energized through a conductor 452, and ground connections 453 and 454, from alternating voltage source 225, to cause movable contact 447 to oscillate between fixed contacts 450 and 451 at the frequency of the source. Fixed contact 450 is connected to the negative terminal of meter 432 by a conductor 456, and fixed contact 451 is connected to slider 442 by conductor 457. The potential of movable contact 447 is alternated between that of fixed contact 450 and that of fixed contact 451, and if the two fixed contacts are not at the same potential a square-wave alternating voltage of the frequency of source 225 appears upon movable contact 447, and is applied to an amplifier 460 through conductor 461 and ground. Operation of movable contact 447 is maintained in phase with the voltage of source 225 by means of a phasing capacitor 463. Conductor 461 includes a blocking capacitor 462.

Amplifier 460 is of the type in which a voltage is obtained at output terminals 466 and 467 which is of the same phase, positive or negative, and the same frequency, as the voltage applied to input terminals 464 and 465. The output voltage is impressed by conductors 470 and 471 upon one winding 472 of a two-phase motor 473 having a second winding 474 and a rotor 475. The power factor of the motor may be improved by the addition of a capacitor 476 across winding 472. Winding 474 is energized from source 225 through ground connections 477 and 454 and conductor 480 and phasing capacitor 481.

Unitary on the shaft 482 of rotor 475 is the rotor 483 of a velocity generator or dynamic transformer 484. This generator has an energizing winding 485 and an output winding 486, the former being energized from source 225 through ground connections 454 and 487, and conductor 490 and phasing capacitor 491. Winding 486 is connected in the input circuit of amplifier 460, which may be traced from terminal 464 through conductor 461, capacitor 462, movable contact 447, fixed contact 450 (or 451), pentode 433 (or slider 442, winding 443 and variable resistor 444), ground connections 437 and 487, winding 486, and conductor 492 to input terminal 465.

The shaft 482 of motor 475 is connected through reduction gearing 493 to a shaft 494 which actuates slider 442 along winding 443. Input shaft 64 to the computer is aso coupled to rotor shaft 482, through reduction gearing 495.

The operation of the converter is as follows. So long as fixed contacts 450 and 451 are at the same potential, regardless of its actual magnitude, no square wave alternating voltage is impressed on the input of amplifier 460. Winding 472 of motor 473 remains unenergized, and neither shaft 494 nor shaft 64 is rotated. This is the normal or balanced condition of the converter.

If the potential at the plate of pentode 433 changes, as by reason of a change in the distance being measured, the potential of fixed contact 450 varies while that of fixed contact 451 remains the same. A square wave alternating voltage is impressed on amplifier 460: the amplifier applies the amplified fundamental component of the square wave, which is of the same frequency as the source 225 and in phase or 180° out of phase with it, to winding 472 of motor 473. An alternating voltage in the same frequency but in phase quadrature is continuously impressed on winding 474 through conductor 480. Under these conditions a rotating field is set up, as is well known to those skilled in the art, and rotor 475 begins to turn, its direction of rotation being determined by the phase of the voltage applied to winding 472. Shaft 494 is driven to adjust the position of slider 442 in a direction to make its potential equal to that of fixed contact 450. Simultaneously rotor 483 of velocity generator 484 is driven, inductively supplying in the input circuit to the amplifier a voltage of the frequency of the source and of an amplitude dependent upon the rate of movement of rotor 183. This voltage is phased to oppose that causing the operation of the motor, to give antihunt action. When fixed contact 451 assumes the same potential as fixed contact 450, the input to amplifier 460 returns to zero and operation of motor 473 ceases.

It is obvious that if fixed contact 450 takes a higher potential than fixed contact 451, the square wave impressed on amplifier 460 is of a first phase relation, while its potential of fixed contact 150 decreases, the square wave is of the opposite phase. After passing through the amplifier the resulting voltage on winding 472 leads or lags the quadrature voltage on winding 474, and hence operation of motor 473 is reversible.

From this and the foregoing explanation it follows that the rotated position of shaft 64 is proportional to the distance being measured, and that this proportionality is maintained, regardless of change in the distance, without influencing the accuracy of the distance measurement.

In connecting computer 70 with connectors 63 and 65, mechanical converter 66 is not completed until slider 246 is adjusted to a position on winding 244 which corresponds to the indicator gear by timer 53, and mechanical converter 64 is not completed until slider 272 is adjusted to a position on winding 270 which corresponds to the indication given by timer 41 after these adjustments are made and mechanical converters 64 and 66 are completed the computer and the interrogaters remain in properly adjusted relation without further attention.

OPERATION

The mode of practicing the invention should now be understandable. A network of ground stations, each including a D. M. E. responder is established in an area to be traversed by aircraft, and a chart is prepared showing the location of each of these stations and its working radius. Figure 8 suggests such a chart: in practice geographic detail is of course included, but this has been omitted in Figure 8 for the sake of clarity. It will be seen from Figure 8 that ground stations are located at points 10, 11, 12, 13, 14, 15, 16, 17, and 18, and that circles 20, 21, 22, 23, 24, 25, 26, 27, and 28 are drawn to show the reliable range of each station.

Suppose it is desired to fly from the point 31 to the point 32 in Figure 8. A line is drawn joining these points on the chart, and the points of intersection of this line with the various circles show the limits within which the several stations can be used by a craft traveling along the lines. Thus station 10 can never be used, since its circle 20 does not touch the line 31, 32 at any point. Station 11 can be used between points 33 and 32, the former point being an intersection of line 31—32 with circle 21, and the latter point lying within the circle. Station 12 can similarly be used between points 34 and 32, station 13 between points 31 and 35, station 14 for the full length of line 31—32, station 15 between points 36 and 32, station 16 between points 31 and 37, station 17 between points 31 and 38, and station 18 between points 39 and 40.

The operator selects pairs of stations to be used in guiding him along the path, the limitations being first that both guiding stations must be on the same side of the line, and second that the line must not come within five miles of a guiding station while it is being used for guidance. This figure can be decreased if the flight is to be at low altitude. It is also preferable to select stations so that their intersecting arcs at any point along the lines for which they are being used are more nearly normal than tangent.

In the present case no two stations on the same side of the line cover the entire distance, which must accordingly be subdivided. Considering the limitations mentioned above, it appears preferable to make three divisions of the line, a first in which stations 13 and 14 are used for guidance, a second using stations 15 and 17 and a third using stations 11 and 12. Guidance in the first section of the flight extends from point 31 to point 35, and in the second section from point 36 to point 38: between points 36 and 35 both guiding stations are available, and as the change-over or "way" point between sets of guiding stations, point 37 is arbitrarily selected. Guidance in the third section extends from point 33 to point 32: between points 33 and 38 both said stations are available, and point 35 is arbitrarily selected as a second way point. This is shown in Figure 9, which reproduces the stations and desired path of Figure 8 in a reduced scale.

A set of coordinate axes is now superimposed on the track, with it Y-axis coinciding with the line 31—32, and its origin at the first way point 37. The scale of the coordinates is the same as the scale of the chart, and the coordinates of guiding stations 13 and 14 on this set of axes are found to be $x_{13}=-53$, $y_{13}=-42$, $x_{14}=-15$, and $y_{14}=+6$. The bearing C of the line is found to be 230° 20′.

The set of coordinate axes is now moved along the line 31—32 so that its origin is at the second way point 35, and the coordinates for guiding stations 15 and 17 are found to be $x_{15}=+24$, $y_{15}=+34$, $x_{17}=+32$ and $y_{17}=-52$. Similarly the coordinates of stations 11 and 12 with the origin of the axes at point 32 are $x_{11}=-61$, $y_{11}=-34$, $x_{12}=-23$, and $y_{12}=+14$. The angle C remains unchanged throughout, since the course is a single straight line.

Six guiding stations are being made use of in this flight. The frequency of each is read from the chart, and a tabulation is made as follows of all the pertinent setting information to be used in the course of the flight.

*Table II*

| Sect. No. | Way Pt. | Station $S_1$ | | | | Station $S_2$ | | | | C |
|---|---|---|---|---|---|---|---|---|---|---|
| | | # | Freq. | $x_1$ | $y_1$ | # | Freq. | $x_2$ | $y_2$ | |
| 1 | 37 | 13 | 1,121 | −53 | −42 | 14 | 1,049 | −15 | +6 | 230°20′ |
| 2 | 35 | 17 | 1,033 | +32 | −52 | 15 | 1,092 | +24 | +34 | 230°29′ |
| 3 | 32 | 11 | 1,108 | −61 | −34 | 12 | 1,064 | −23 | +14 | 230°20′ |

Two conditions of proposed flight may prevail: the pilot may propose to fly the craft manually, using the indications of the computer to guide him in azimuth and check his progress compared to his schedule, at selected points, or the craft may be provided with an automatic pilot with which the computer is to be connected to control the craft in azimuth or in azimuth and air speed. The first condition will be considered in detail.

Before reaching point 31 the pilot energizes D. M. E. interrogators 40 and 52, converters 63 and 65, and amplifiers 304, 305, 323 and 327. He tunes interrogator 40 to 1121 megacycles and interrogator 52 to 1049 megacycles.

The receiving and transmitting frequencies of all D. M. E. responders in the area have a known relationship, and a suitable mechanical connection in each interrogator makes it necessary to operate only one tuning knob to tune both the transmitter and the receiver to the frequencies of any desired responder. The latter are in continuous operation, and as soon as an interrogator is tuned to a particular responder within its operative range, the resistance of pentode 433 (Figure 4) is brought to a particular value, meter 432 indicates the distance related thereto, and fixed contact 450 assumes a potential with respect to ground also related thereto.

It is unlikely that the distance from the craft to the ground station is the same as that which prevailed when the converter was last turned off, so that the potential of fixed contact 450 is not that to which fixed contact 451 was brought by operation of motor 473. Suppose the craft is now further from the ground station than it was when the converter was last used: then fixed contact 450 is at a higher potential with respect to ground than fixed contact 451, and a square wave alternating voltage is impressed upon amplifier 460 in such a phase as to cause "forward" operation of motor 473, moving slider 442 to the right to increase the potential of fixed contact 451, and simultaneously acting through shaft 64 to move slider 272 to the right along winding 270. When fixed contact 451 is brought to the potential of fixed contact 450, operation of motor 473, which has been made substantially dead beat by the action of velocity generator 484, is interrupted, and sliders 442 and 272 have been brought into adjusted position. As the craft moves in space amplifier 460 and motor 473 function to keep fixed contact 451 at the same potential as fixed contact 450, and the position of slider 272 is thus coordinated with the distance from the craft to the ground station. In the same way converter 65 cooperates with interrogator 52 to coordinate the position of slider 246 on winding 244 with the distance from the craft to station $S_2$. However, since switch 83 is open the movement of sliders 246 and 272 has no effect on motors 107 and 110. Except for a slight initial random movement which may occur as the amplifiers warm up, the motors remain in their last adjusted positions.

From the chart it is determined that point 31 is 57 miles distant from ground station 13, and 74 miles distant from ground station 14. Approach to point 31 can be observed by watching the indications of interrogators 40 and 52, which approach readings of 57 miles and 74 miles as the point is approached.

Indicator 71 preferably has a total travel of plus or minus 10 miles, to give more sensitive indication of small departures from the desired path. Hence, the computer is not used until the reading of interrogator 40 approaches 57 miles and that of interrogator 52 approaches 74 miles. Switch 83 can then be closed.

Closure of switch 83 energizes transformers 227 and 234, so that voltages appear across secondary windings 230, 231, 232, 235, 236, 237, and 552. Sliders 260, 264, 282, and 286 have been set by operation of knobs 75, 80, 74, and 77 respectively, and sliders 246 and 272 have been set by converters 63 and 65. Input 257 has been adjusted in accordance with $(90°+C)$ by setting of knobs 82. Switch arm 555 is set on the arc of contacts 557 which is connected to center tap 553, by knob 556, since the craft is to follow the Y axis and hence $X_t=0$. The values of $b_1$ and $b_2$ are fortuitous: sliders 252 and 314 are set to give voltages of magnitudes $(\cos 90°+C-b_2)$, sliders 253 and 310 to give voltages of magnitude $\sin(90°+C-b_2)$, sliders 276 and 311 to give voltages of magnitudes $\cos(90°+C-b_1)$, and sliders 277 and 315 to give voltages of magnitude $\sin(90°+C-b_1)$.

Computer 70 proceeds to operate on a pair of trial vectors of length $D_1$ and $D_2$ whose bearings are arbitrarily $b_1$ and $b_2$. Resolver 250 gives outputs proportional to the X- and Y- components of the first trial vector, and resolver 274 gives outputs proportional to the X- and Y- components of the second trial vector. The X- and Y- coordinates of the ends of the discrepancy vector appear as voltages between center taps 263, 285 and 267, 291 and ground and the X- and Y- components of the discrepancy vector appear across the windings of resolvers 302 and 303. The component of the discrepancy vector normal to trial vector $D_1$ appears at the input to amplifier 327 and that normal to trial vector $D_2$ appears at the input to amplifier 323.

If it so happens that the values for $b_1$ or $b_2$ actually coincide with the true bearings of the datum vectors from the ground stations, the discrepancy vector is zero and the inputs to amplifiers 323 and 327 are also zero: no operation of motors 107 and 110 then takes place. In general the values for $b_1$ and $b_2$ are not those desired, and motor 107 or motor 110 or both are energized.

The sliders of resolvers 250, 274, 302 and 303 are adjusted until $d_1$ and $d_2$, the components of the discrepancy vector normal to the trial vectors, become simultaneously zero, at which time no voltage appears across the primary windings of transformers 292 and 293. Motors 107 and 110 are deenergized and for a particular position of the craft the computer is in balance.

No voltage appears across primary winding 296, but there is a voltage between center tap 300 and ground, which is proportional to the X- coordinate of the position of the craft, unless the craft is exactly on the desired path. This voltage is applied to indicator 71, which shows by displacement from its central zero position any deviation of the craft from the desired path. By proper operation of the rudder and ailerons the pilot is enabled to cause the craft to seek out and remain on the line 31—32.

A voltage also appears, even when the computer is in balance, between center tap 301 and ground, which is proportional to the Y- coordinate of the position of the craft. As pointed out in connection with Figure 8, the origin of this set of coordinates has been arbitrarily selected as point 33. When the craft is at that point the indication of indicator 72 becomes zero, but for any other position of the craft along the line 31—33 indicator 72 gives a reading which is a measure of the along-track distance of the craft from the point 33. From the chart the distance 31—33 is found to be 58 miles, so that if upon observation of indicator 72 a reading in excess of this amount is observed, the pilot knows that he has not yet reached point 31. As the flight proceeds from point 31 towards point 32 the reading of indicator 72 continuously decreases, until at point 33 it becomes zero. This is an indication to the pilot that he should retune his interrogaters and reset his manual knobs for the second section of the flight, between points 33 and 35.

Azimuth control of a craft by an automatic pilot connected to computer 70 is in general the same as the manual control just recited, but requires means for converting the $x_d$ voltage to a form capable of operating the aileron and rudder of the craft. The details of azimuth controller 328 depend to a considerable extent upon the type of automatic pilot provided in the aircraft. One particular system which has been satisfactory in practice is illustrated in my copending application previously referred to, but any convenient means for making use of the $x_d$ voltage to control suitable servomotors may be made use of as desired.

The advantage of $x_t$ knob 556 is particularly apparent in aircraft having automatic pilots. Such craft normally operate in fleets, and occasions frequently arise when it is desirable for one craft to pass another. If only a single track is available, this means that one craft or the other must depart from the track to permit the other to pass. By providing a plurality of tracks it is easy for craft which have to pass to be assigned different tracks, so that no necessity of change during the flight takes place. This is the function of $x_t$ switch 554 and transformer 550.

Control of the air speed of a craft having an automatic pilot requires the further provision of a scheduling computer as pointed out above, since deviation of the craft from schedule is the difference between the along-track component of its present position and that which it should have. Details of a suitable scheduling computer and of its interrelation with a navigating computer and an automatic pilot are given in my copending application referred to above, and the present application contemplates the use of such a device energized from computer 70 with voltage proportional to $y_p$, as a new inventive contribution.

In the foregoing application I have disclosed means for determining the components of a craft's position normal to and parallel to a selected track, based upon knowledge of the distance from the craft to two fixed stations and of the locations of the stations. It is also taught herein to use outputs proportional to these components for indicating departure of the craft from the desired course, and for automatically maintaining the craft on the course and on a desired schedule. Specifically an electrical device is provided for performing analytical computations to determine the coordinates of the point of intersection of two lines of known length extending from points whose coordinates are also known. The method used is that of repeated approximation, reducing to zero the discrepancy vectors due to incorrect assumptions of directions for the two lines, and a particular feature of circuit novelty is included whereby a transformer is used to supply outputs proportional to the difference and the average, or the sum on a different scale, of two variables.

It should be borne in mind that the purpose of knob C and associated structure is for the convenience of the user in giving a continuous indication of the bearing of the track being followed. If this is not desired, the angles $b_1$ and $b_2$ can be measured directly from the positive direction of the X-axis as zero, according to conventional mathematical usage, and knob 82 and its associated structure may then be omitted.

Numerous objects and advantages of my invention have been set forth in the foregoing description, together with details of the structure and function of the invention, and the novel features thereof have been clearly disclosed. The disclosure, however, is illustrative only and I may make changes in detail, especially in matters of shape, size, and arrangement of parts, within the principle of the invention to the full extent indicated by the broad general meaning of the terms in which the appended claims are expressed.

I claim as my invention:

1. In a device of the class described, in combination: means for computing the coordinates, on a pair of axes, of trial points at assumed distances and in assumed directions from points of assumed location; means for adjusting said computing means to correlate said assumed locations with the actual locations of a pair of reference points; means for adjusting said computing means to correlate said assumed distances with actual distances from said reference points to a selected point of variable position; means computing the components, normal to said assumed directions, of the line joining said trial points; means adjusting said first named computing means, in accordance with said components, to change said assumed directions so as to bring said trial points into coincidence at a point where the coordinates of both said trial points become identical with the coordinates of said selected point; and means performing a control function in accordance with the magnitude of one of said coordinates.

2. Aircraft control apparatus, comprising, in combination: means for computing the coordinates, on a pair of axes, of trial points at assumed distances and in assumed directions from points of assumed locations; means for adjusting said computing means to correlate said assumed locations with the actual locations of a pair of radio transmitters; radio responsive means for adjusting said computing means to correlate said assumed distances with actual distances from said transmitters to a movable craft; means computing the components, normal to said assumed directions, of the line joining said trial points; means adjusting said first named computing means, in accordance with said components, to change said assumed directions so as to bring said trial points into coincidence at a point where the coordinates of both said trial points become identical with the coordinates of said movable point; means computing the displacement of the point of coincidence of said trial points from a selected line; and means controlling the movement of the craft in accordance with said displacement.

3. In a device of the class described, in combination: a craft to be guided, along a selected path with respect to two fixed stations of known positions, to a destination also of known position; means giving a first output proportional to the distance of said craft from a first of said stations; means giving a second output proportional to the distance of said craft from a second of said stations; means giving outputs adjustable in accordance with the components, parallel and perpendicular to said path, of the lines joining said fixed stations with a point having a known location relative to said desination; means computing from said outputs the components, parallel and perpendicular to said path, of the line joining said destination and the position of said craft; and means responsive to deviation of the components so computed from desired values.

4. In a device of the class described, in combination: a craft to be guided, along a selected path with respect to two fixed stations of known positions, to a destination also of known position; means giving a first output proportional to the distance of said craft from a first of said stations; means giving a second output proportional to the distance of said craft from a second of said stations; means computing from said outputs the components, parallel and perpendicular to said path, of the line joining a destination on said path with the position of said craft; and means responsive to deviation of the components so computed from desired values.

5. In a device of the class described, in combination: a craft to be guided along a selected path with respect to two fixed stations of known positions; means giving a first output proportional to the slant distance of said craft from a first of said stations; means giving a second output proportional to the slant distance of said craft from a second of said stations; means computing from said outputs the displacement of said craft from said path; and means responsive to deviation of the displacement so computed from a desired value.

6. In a device of the class described, in combination: means adjustable to give outputs according to the lengths of first and second vectors extending from first and second points whose coordinates are known; means adjustable to give outputs in accordance with said coordinates; means adjustable to give outputs in accordance with the direction of each of said vectors, computing means energized in accordance with said outputs, for determining the coordinates of the heads of said vectors and means, actuated whenever said means after adjustment do not represent vectors extending from said points to terminate at a common point, for further adjusting at least one of said last named adjustable means in accordance with the component, normal to the direction of one of said vectors, of the discrepancy vector joining the heads of said vectors.

7. In a device of the class described, in combination: first setting means adjustable to determine outputs in accordance with the coordinates, with respect to a set of axes, of a first point of known location; second setting means adjustable to determine outputs in accordance with the coordinates of a second point of known location; distance means continuously adjusted to give outputs in accordance with the magnitudes of a pair of datum vectors extending from said points to terminate at a third point; angle means adjustable to modify said last named outputs in accordance with assumed directions of trial vectors extending from said first and second points and equal in magnitude to said datum vectors; means actuated in accordance with the outputs determined by said setting, distance, and angle means to compute the component, normal to one of said trial vectors, of the discrepancy vector joining the heads of said trial vectors; and motor means actuating one of said angle means in accordance with said component; to reduce said component to zero.

8. In a device of the class described, in combination: first setting means adjustable to give outputs in accordance with the coordinates, with respect to a set of axes, of a first point of known location; second setting means adjustable to give outputs in accordance with the coordinates of a second point of known location; distance means continuously adjusted to give outputs in accordance with the magnitudes of a pair of datum vectors extending from said points to terminate at a third point; angle means adjustable to modify said last named outputs in accordance with the directions of trial vectors extending from said first and second points and equal in magnitude to said datum vectors; means actuated in accordance with the outputs determined by said setting, distance, and angle means to compute the co-ordinates of the head of each of said trial vectors; means computing from said coordinates the component normal to one of said trial vectors of the discrepancy vector joining the heads of said trial vectors; and motor means actuating one of said angle means in accordance with said component; to reduce said component to zero.

9. In a device of the class described, in combination: first setting means adjustable to give outputs in accordance with the coordinates, with respect to a set of axes, of a first point of known location; second setting means adjustable to give outputs in accordance with the coordinates of a second point of known location; distance means continuously adjusted to give outputs in accordance with the magnitudes of a pair of datum vectors extending from said points to terminate at a third point; angle means adjustable to modify said last named outputs in accordance with the directions of trial vectors extending from said first and second points and equal in magnitude to said datum vectors; means actuated in accordance with the outputs determined by said setting, distance, and angle means to compute the components normal to said trial vectors of the discrepancy vector joining the heads of said trial vectors; and motor means actuating said angle means in accordance with said components, to reduce said discrepancy vector to zero.

10. In a device of the class described, in combination: first setting means adjustable to give outputs in accordance with the coordinates, with respect to a set of axes, of a first point of known location; second setting means adjustable to give outputs in accordance with the coordinates of a second point of known location; distance means continuously adjusted to give outputs in accordance with the magnitudes of a pair of datum vectors extending from said points to terminate at a third point; angle means adjustable to modify said last named outputs in accordance with the directions of trial vectors extending from said first and second points and equal in magnitude to said datum vectors; means actuated in accordance with the outputs determined by said setting, distance, and angle means to compute the coordinates of the head of each of said trial vectors; means computing from said coordinate the components normal to said trial vectors of the discrepancy vector joining the heads of said trial vectors; motor means actuating said angle means in accordance with said components, to reduce said discrepancy vector to zero, so that the coordinates of the ends of said trial vectors are identical; and means computing the difference between one of said coordinates and a selected coordinate.

11. In a device of the class described, in combination: first setting means adjustable to give outputs in accordance with the coordinates, on a set of axes, of a first point of known location; second setting means adjustable to give outputs in accordance with the coordinates of a second point of known location; distance means continuously adjusted to give outputs in accordance with the magnitudes of a pair of datum vectors extending from said points to terminate at a third point; angle means adjustable to modify said last named outputs in accordance with the directions of trial vectors extending from said first and second points and equal in magnitude to said datum vectors; means actuated in accordance with the outputs determined by said setting, distance, and angle means to compute the coordinates of the head of each of said trial vectors; means computing from said coordinate the components normal to said trial vectors of the discrepancy vectors joining the heads of said trial vectors; motor means actuating said angle means in accordance with said components, to reduce said discrepancy vector to zero, so that the coordinates of the ends of said trial vectors are identical; means computing the difference between one of said coordinates and a selected coordinate; and means performing a control function in accordance with said difference.

12. Means for determining the coordinates of a point, on a set of coordinate axes, when the length of a pair of datum vectors terminating on said point, and the coordinates of the other ends of said vectors, are known, comprising, in combination: means adjustable to give outputs in accordance with said known coordinates; means adjustable to give outputs in accordance with said known lengths; means adjustable to modify said last named outputs in accordance with the directions of trial vectors extending from said points and equal in magnitude to said datum vectors; means computing the coordinates of the heads of said trial vectors; means computing the components normal to said trial vectors of the discrepancy vector joining the heads thereof; and means adjusting said last named adjusting means in accordance with the components of said discrepancy vector normal to the directions of said trial vectors, to make the coordinates of the heads of said vectors identical with those of said datum vectors, so that the coordinates of the heads of both said trial vectors become equal to the desired coordinates.

13. Means for simultaneously computing the average of and the difference between two quantities comprising in combination a transformer having a secondary winding and a primary winding with an intermediate tap, means supplying alternating voltages proportional to said quantities on a first scale, a common conductor, means connecting one of said voltages between said common conductor and one terminal of said primary winding, and means connecting the other of said voltages between said common conductor and the other terminal of said primary winding, so that the voltage between said common conductor and said tap is a measure of the average of said quantities on a second scale, and the voltage induced in said secondary winding is a measure of the difference between said quantities.

14. In a device of the class described, in combination: first means computing the values of a first pair of functions of a first variable; second means computing the values of a second pair of functions of a second variable; third means, operatively connected to said first and second means, computing the sum of and the difference between one of the functions of said first pair and one of the functions of said second pair; fourth means operatively connected to said first and second means, computing the sum of and the difference between the other function of said first pair and the other function of said second pair; means operatively connected to one of said third and fourth means for performing a control function in accordance with the sum computed thereby; fifth means, operatively connected to said third and fourth means, for computing the sum of functions of the differences computed thereby; sixth means, operatively connected to said third and fourth means, for computing the sum of further functions of said differences; and means actuated in accordance with said last named sums for adjusting the values of said first and second variables, so as to vary the values of said first named sums and differences, and to reduce said last named sums to zero.

15. In a device of the class described, in combination: means adjustable to give outputs in accordance with the abscissa and ordinate of a first fixed point with respect to a set of axes; means adjustable to give outputs in accordance with the abscissa and ordinate of a second fixed point with respect to said axes; means adjustable to give outputs in accordance with the known distances of a movable point from said fixed points; means adjustable to modify said last named outputs in accordance with angles assumed as the directions of said third point from said first and second points; means computing the coordinates of the ends of lines of said known lengths extending from said known points in said assumed directions; means determining the components, normal to each of said lines, of the line connecting said computed points; and means adjusting said fourth named means in accordance with the magnitude and direction of said components.

16. In a device of the class described, in combination: first means giving outputs proportional to the differences between and the averages of the values of first and second pairs of variables; second means giving outputs proportional to the differences between functions of said differences; and means actuated in accordance with said last named outputs to vary said values until said differences become zero, and said values become equal to said averages.

17. In a device of the class described, in combination: an electrical network including an output device; means adjusting said network in accordance with characteristics of the known positions of a pair of fixed points; means adjusting said network in accordance with the known distances between said points and a third point; and means adjusting said network in accordance with functions of angles assumed as the directions of said third point from said fixed points, so that said device gives an output proportional to the relation between first characteristics of the positions of trial points determined by said known distances and said assumed angles.

18. In a device of the class described, in combination: an electrical network including an output device; means adjusting said network in accordance with characteristics of the known positions of a pair of fixed points; means adjusting said network in accordance with the known distances between said points and a third point; means adjusting said network in accordance with functions of angles assumed as the directions of said third point from said fixed points, so that said device gives an output proportional to the relation between first characteristics of the positions of trial points determined by said known distances and said assumed angles; and means, included in said output device, giving an output proportional to the average of said first characteristics of said trial points.

19. In a device of the class described, in combination: a first electrical network including a first output; means adjusting said first network in accordance with first characteristics of the known positions of a pair of fixed points; a second electrical network including a second output device; means adjusting said second network in accordance with second characteristics of said known positions of said fixed points; means adjusting said networks in accordance with the known distances between said points and a third point; means adjusting said networks in accordance with functions of angles assumed as the directions of said third point from said fixed point, so that said first device gives an output proportional to the relation between first characteristic of the position of trial points determined by said known distances and said assumed angles, and so that said second device gives an output proportional to the relation between second characteristics of said positions of said trial points; a third electrical network including a third output device; means adjusting said third network in accordance with the outputs of said first and second output devices; means adjusting said third network in accordance with further functions of one of said angles; and means actuating the means adjusting said networks in accordance with functions of said angles to change the value of one of said angles in accordance with the output from said third device.

20. Apparatus according to claim 19 together with a further electrical network including a further output device; means adjusting said further network in accordance with the outputs of said first and second output devices; means adjusting said further network in accordance with further functions of the other of said angles; and means actuating the means adjusting said network in accordance with functions of said angles to change the value of said angle in accordance with the output from said fourth device.

21. In a device of the class described, in combination: a pair of electrical devices; means adjusting said devices proportional to the distances between a movable point and a pair of fixed points; a plurality of further electrical devices; means adjusting said further devices proportional to selected coordinates of the positions of said fixed points; means to be actuated in proportion to like coordinates of the position of said movable point, and an electrical network including said devices for controlling actuation of said last named means in accordance with the adjustments of said adjusting means.

22. In a system of the class described, in combination: means adjustable in accordance with the locations of first and second points; means for simulating the lengths and directions of trial vectors extending from said points; means adjusting said length simulating means in accordance with the known distances of a third point from said first and second points; means adjusting said direction simulating means in accordance with assumed directions of said third point from said first and second points; means responsive to the adjusted condition of said adjusting means to give an output which is zero when the adjustment corresponds to a pair of vectors whose heads coincide; and means actuating said last named means, whenever said output is not zero, to bring about coincidence thereof.

23. In a device of the class described, in combination: a first electrical network including a first output device; means adjusting said first network in accordance with first characteristics of the known positions of a pair of fixed points; a second electrical network including a second output device; means adjusting said second network in accordance with second characteristics of said known positions of said fixed points; means adjusting said networks in accordance with the known distances between said points and a third point; and means adjusting said networks in accordance with functions of angles assumed as the directions of said third point from said fixed point, so that said first device gives an output proportional to the relation between first characteristics of the position of trial points determined by said known distances and said assumed angles, and said second device gives an output proportional to the relation between second characteristics of said positions of said trial points.

24. Apparatus according to claim 23, and means included in said second output device for giving an output proportional to the average of said second characteristics.

25. In a device of the class described, in combination: means continuously giving outputs proportional to the distances between a movable point and each of a plurality of fixed points; means adjustable to give outputs proportional to coordinates of the positions of said fixed points; means for giving outputs proportional to coordinates of the position of said movable point; and means combining said outputs to control said last named means.

26. In a device of the class described, in combination: a craft to be guided, along a selected path with respect to two fixed stations of known positions, to a destination also of known position; means giving a first output proportional to the slant distance of the craft from a first of said stations; means giving a second output proportional to the slant distance of said craft from a second of said stations; means giving outputs adjustable in accordance with the components, parallel and perpendicular to said path, of the lines joining said fixed stations with a point having a known location relative to said destination; means computing from said outputs the component parallel to said path of the line joining said destination with the position of said craft; and means responsive to deviation of the components so computed from a desired value.

27. In a device of the class described, in combination: a craft to be guided, along a selected path with respect to two fixed stations of known positions, to a destination also of known position; means giving a first output proportional to the slant distance of said craft from a first of said stations; means giving a second output proportional to the slant distance of said craft from a second of said stations; means giving outputs adjustable in accordance with the components, parallel and perpendicular to said path, of the lines joining said fixed stations with a point having a known location relative to said destination; means computing from said outputs the displacement of said craft from said path; and means responsive to deviation of the components so computed from a desired value.

OSCAR HUGO SCHUCK.

References Cited in the file of this patent

UNITED STATES PATENTS

| Number | Name | Date |
|---|---|---|
| 2,133,285 | Dunmore | Oct. 18, 1938 |
| 2,472,129 | Streeter | June 7, 1949 |